United States Patent
Elliot (10) Patent No.: US 10,805,664 B2
(45) Date of Patent: Oct. 13, 2020

(54) WIRELESS AUDIO SYNCHRONIZATION

(71) Applicant: Bose Corporation, Framingham, MA (US)

(72) Inventor: Michael William Elliot, Grafton, MA (US)

(73) Assignee: Bose Corporation, Framingham, MA (US)

( * ) Notice: Subject to any disclaimer, the term of this patent is extended or adjusted under 35 U.S.C. 154(b) by 2 days.

(21) Appl. No.: 16/159,921

(22) Filed: Oct. 15, 2018

(65) Prior Publication Data

US 2020/0120378 A1    Apr. 16, 2020

(51) Int. Cl.
| | |
|---|---|
| *H04W 56/00* | (2009.01) |
| *G06F 1/12* | (2006.01) |
| *H04R 3/12* | (2006.01) |
| *H04N 21/43* | (2011.01) |
| *H04N 21/242* | (2011.01) |
| *H04N 21/8547* | (2011.01) |

(52) U.S. Cl.
CPC .......... *H04N 21/4307* (2013.01); *G06F 1/12* (2013.01); *H04N 21/242* (2013.01); *H04N 21/8547* (2013.01); *H04R 3/12* (2013.01); *H04W 56/001* (2013.01)

(58) Field of Classification Search
CPC ................ H04W 56/00–0095; G06F 1/04–14
See application file for complete search history.

(56) References Cited

U.S. PATENT DOCUMENTS

| | | | | |
|---|---|---|---|---|
| 8,095,120 | B1 * | 1/2012 | Blair ..................... | H04M 3/562 379/202.01 |
| 9,219,456 | B1 * | 12/2015 | Ayrapetian ............... | H04B 3/23 |
| 9,319,782 | B1 * | 4/2016 | Crump ..................... | H04R 3/02 |
| 2005/0254674 | A1 * | 11/2005 | Huang .................... | G06F 1/1626 381/190 |

(Continued)

FOREIGN PATENT DOCUMENTS

WO    2005002100 A1    1/2005

OTHER PUBLICATIONS

International Search Report and Written Opinion dated Feb. 17, 2020 for International Application No. PCT/US2019/056329.

(Continued)

*Primary Examiner* — Emmanuel L Moise
*Assistant Examiner* — Julian Chang (57) ABSTRACT

An audio distribution system includes a first playback device with a first clock time, and a second playback device with a second clock time. A wireless access point is wirelessly coupled to the first and second playback devices. The second playback device sends a time request to the first playback device via the wireless access point. The first playback device responds to the time request by sending a time response to the second playback device via the wireless access point. The second playback device calculates an update to the second clock time based on the time response, a first physical transmission rate between the second playback device and the wireless access point, and a second physical transmission rate between the first playback device and the wireless access point. The second playback device uses the update to the second clock time to playback audio in synchrony with the first playback device.

20 Claims, 5 Drawing Sheets

(56) References Cited

U.S. PATENT DOCUMENTS

| | | | |
|---|---|---|---|
| 2009/0238132 A1* | 9/2009 | Nabetani | H04W 74/0808 |
| | | | 370/329 |
| 2010/0220877 A1* | 9/2010 | Ishibashi | H04R 1/403 |
| | | | 381/170 |
| 2010/0329125 A1 | 12/2010 | Roberts et al. | |
| 2015/0098354 A1* | 4/2015 | Perez Grovas | H04W 52/0225 |
| | | | 370/253 |
| 2015/0334338 A1* | 11/2015 | Lim | H04N 21/4108 |
| | | | 348/515 |
| 2016/0170437 A1* | 6/2016 | Aweya | H04J 3/0667 |
| | | | 713/503 |
| 2016/0291925 A1* | 10/2016 | Kohara | H04N 21/41407 |
| 2017/0069338 A1 | 3/2017 | Elliot et al. | |
| 2017/0098466 A1* | 4/2017 | Elliot | H04J 3/0641 |
| 2017/0195980 A1 | 7/2017 | Aggarwal et al. | |
| 2019/0045304 A1* | 2/2019 | Bhalla | H04R 3/12 |
| 2019/0380190 A1* | 12/2019 | Nakamura | H04R 3/12 |

OTHER PUBLICATIONS

Chung-Ping Young et al: "The Implementation of a Wired/Wireless Multimedia Playback System", Innovative Computing, Information and Control, 2007. ICICIC '07. Second International Conference On, IEEE, PI, Sep. 1, 2007 (Sep. 1, 2007), pp. 62-62, XP031200118, ISBN: 978-0-7695-2882-3, p. 2, col. 1-col. 2; p. 3, col. 2.

* cited by examiner

FIG. 5

WIRELESS AUDIO SYNCHRONIZATION

BACKGROUND

This disclosure relates to wireless audio synchronization.

SUMMARY

All examples and features mentioned below can be combined in any technically possible way.

In one aspect, audio distribution system includes a first audio playback device that includes a first clock having a first clock time, and a second audio playback device that includes a second clock having a second clock time. A wireless access point wirelessly coupled to the first and second audio playback devices. The second audio playback device is configured to send a time request to the first audio playback device via the wireless access point. The first audio playback device is configured to respond to the time request by sending a time response to the second audio playback device via the wireless access point. The second audio playback device is configured to calculate an update to the second clock time based on the time response, a first physical transmission rate between the second audio playback device and the wireless access point, and a second physical transmission rate between the first audio playback device and the wireless access point, thereby to synchronize the second clock time to the first clock time. The second audio playback device is configured to use the update to the second clock time to playback audio in synchrony with the first audio playback device.

Implementations may include one of the following features, or any combination thereof.

In some implementations, the second audio playback device is configured to calculate a first time duration (Tgo) corresponding to the time it took to transmit the time request from the audio playback device to the other audio playback device less a first delay attributable to the first physical transmission rate.

In certain implementations, the second audio playback device is configured to record a value of the second clock time when the time request is sent with a first time stamp (T0), and the second audio playback device is configured to calculate the first time duration using the first time stamp.

In some cases, the first audio playback device is configured to record a value of the first clock time when the time request is received at the first audio playback device with a second time stamp (T1), and the second audio playback device is configured to calculate the first time duration using the second time stamp.

In certain cases, the first audio playback device is configured to record a value of the first clock time when the time response is sent from the first audio playback device with a third time stamp (T2), and the second audio playback device is configured to calculate a second time duration (Tback) using the third time stamp.

In some examples, the second audio playback device is configured to record a value of the second clock time when the time response is received with a fourth time stamp (T3), and the second audio playback device is configured to calculate the second time duration using the fourth time stamp.

In certain examples, the second audio play back device is configured to calculate a round trip time based on the first time duration and the second time duration.

In some implementations, the second audio playback device is configured to calculate the update to the second clock time using the round trip time and the third time stamp.

In certain implementations, the second audio playback device is configured to calculate a second time duration (Tback) corresponding to the time it took to transmit the time response from the first audio playback device to the second audio playback device less a second delay attributable to the second physical transmission rate.

In some cases, the second audio play back device is configured to calculate a round trip time based on the first time duration and the second time duration.

In certain cases, the second audio playback device is configured to calculate the update to the second clock time based on a value of the first clock time when the time response is sent from the first audio playback device and the round trip time.

In some examples, the second audio playback device is configured to record a value of the second clock time when the time request is sent with a first time stamp (t0), wherein the second audio playback device is configured to calculate the update to the second clock time based on the first time stamp.

In certain examples, the first audio playback device is configured to record a value of the first clock time when the time request is received at the first audio playback device with a second time stamp (T1), and the second audio playback device is configured to calculate the update to the second clock time based on the second time stamp.

In some implementations, the first audio playback device is configured to include the first time stamp in the time response.

In certain implementations, the first audio playback device is configured to record a value of the first clock time when the time response is sent from the first audio playback device with a third time stamp (T2), and the second audio playback device is configured to calculate the update to the second clock time based on the third time stamp.

In some cases, the first audio playback device is configured to include the first time stamp in a subsequent message, after the time response, sent to the second audio playback device via the wireless access point.

In certain cases, the second audio playback device is configured to record a value of the second clock time when the time response is received with a fourth time stamp (T3), and the second audio playback device is configured to calculate the update to the second clock time based on the fourth time stamp.

In another aspect, an audio playback device includes a digital-to-analog converter configured to receive an audio stream including a digital representation of audio content via a network and convert to analog form. The audio playback device also includes an electro-acoustic transducer; and a network interface. A processor is coupled to the digital-to-analog converter, the electro-acoustic transducer, and the network interface. The device also includes instructions stored on a non-transitory computer-readable media that, when executed, cause the processor to: send a time request to an other audio playback device via a wireless access point wirelessly coupled to the network interface; receive, in response to the time request, a time response from the other audio playback device via the wireless access point; calculate an update to a local clock time based on the time response, a first physical transmission rate between the audio playback device and the wireless access point, and a second physical transmission rate between the other audio playback device and the wireless access point, thereby to synchronize a local clock time to an other clock time maintained by the other audio playback device; and update the local clock time, based on the calculation, to playback audio in synchrony with the first audio playback device.

Implementations may include one of the above and/or below features, or any combination thereof.

In some implementations, the instructions further cause the processor to calculate a first time duration (Tgo) corresponding to the time it took to transmit the time request from the audio playback device to the other audio playback device less a first delay attributable to the first physical transmission rate.

In certain implementations, the instructions further cause the processor to calculate a second time duration (Tback) corresponding to the time it took to transmit the time response from the other audio playback device to the audio playback device less a second delay attributable to the second physical transmission rate.

In some cases, the instructions further cause the processor to calculate a round trip time based on the first time duration and the second time duration.

In certain cases, the instructions further cause the processor to calculate the update to the local clock time based on a value of the other clock time when the time response is sent from the other audio playback device and the round trip time.

In some examples, the instructions further cause the processor to record a value of the local clock time when the time request is sent with a first time stamp (T0), and the audio playback device is configured to calculate the update to the local clock time based on the first time stamp.

In certain examples, the instructions further cause the processor to calculate the update to the local clock time based on a second time stamp (T1) that corresponds to a value of the other clock time when the time request is received at the other audio playback device.

In some implementations, the instructions further cause the processor to calculate the update to the local clock time based on a third time stamp (T2) that corresponds to a value of the other clock time when the time response is sent from the other audio playback device.

In certain implementations, the instructions further cause the processor to calculate the update to the local clock time based on a fourth time stamp (T3) that corresponds to a value of the local clock time when the time response is received.

In some cases, the audio playback device includes a crystal oscillator coupled to the processor and configured to provide a clock signal to the processor, wherein the processor uses the clock signal to maintain the local clock time.

Another aspect features a method for synchronizing respective clocks on a plurality of audio playback devices. The plurality of audio playback devices includes a first audio playback device having a first clock time, and a second audio playback device having a second clock time. A time request is sent from the second audio playback device to the first audio playback device via a wireless access point. In response to the time request, a time response is sent from the first audio playback device to the second audio playback device via the wireless access point. An update to the second clock time is calculated based on the time response, a first physical transmission rate between the second audio playback device and the wireless access point, and a second physical transmission rate between the first audio playback device and the wireless access point, thereby to synchronize the second clock time to the first clock time. The update is used to the second clock time to playback audio in synchrony with the first audio playback device.

Implementations may include one of the above and/or below features, or any combination thereof.

In some implementations, the update is calculated at the second audio playback device.

DETAILED DESCRIPTION

Some known whole home audio systems consist of a plurality of audio player units, which may be arranged in various rooms throughout a home, and which communicate with each other over a local area network (LAN). Generally, one or more of the player units has access to a source of audio content, which may be a source available over a wide area network (WAN), such as an Internet radio station. Typically, two or more of the individual units can be grouped together, at a user's discretion, into what is often referred to as a zone, in which the grouped player units within the zone playback (render) audio content in synchrony.

To achieve synchronized playback of media content (e.g., music) from a plurality of distributed playback devices on a network, it can be important to synchronize the respective clocks of those devices. Clock synchronization typically involves a series of communications during which a first device (e.g., a master device) shares its clock time information with one or more other devices (e.g., slave device(s)), which the slave(s) then use to update their clocks to match that of the master. One known method for synchronizing clocks over a packet-switched, variable-latency data network is known as the Network Time Protocol (NTP).

This disclosure is based, in part, on the discovery that problems may arise with known clock synchronization techniques in situations in which there is a significant amount of change to a physical transmission rate (hereinafter "phy rate") on a network. Such changes in the phy rate can cause disruptions in the time that it takes to send a packet from one network node (e.g., a first audio playback device) to another network node (e.g., a second audio playback device). Such variations in the phy rate may also contribute to asymmetry in the transmission times; i.e., such that the time to transmit a communication in one direction differs substantially from the time it takes to transmit in the opposite direction.

These variations in the phys rate can be caused by implementation details in how a network access point (AP) works. Some access points (APs) go into a non-communicative mode for several hundred milliseconds at a time, so other network devices trying to communicate through the AP want to drop their phy rate in that moment. As an example of one place where that would be seen, devices trying to send packets to the AP would drop their phy rate because, generally, they are unable to distinguish a difference between a dropped packet and the AP operating in a non-communicative mode. In addition, if the devices are operating over a long range, or if there is a sudden temporary disturbance or noise injection on the network, the phy rate can change very quickly, and, in those situations, it can be desirable to have a synchronization algorithm that behaves more consistently.

Figure 1:
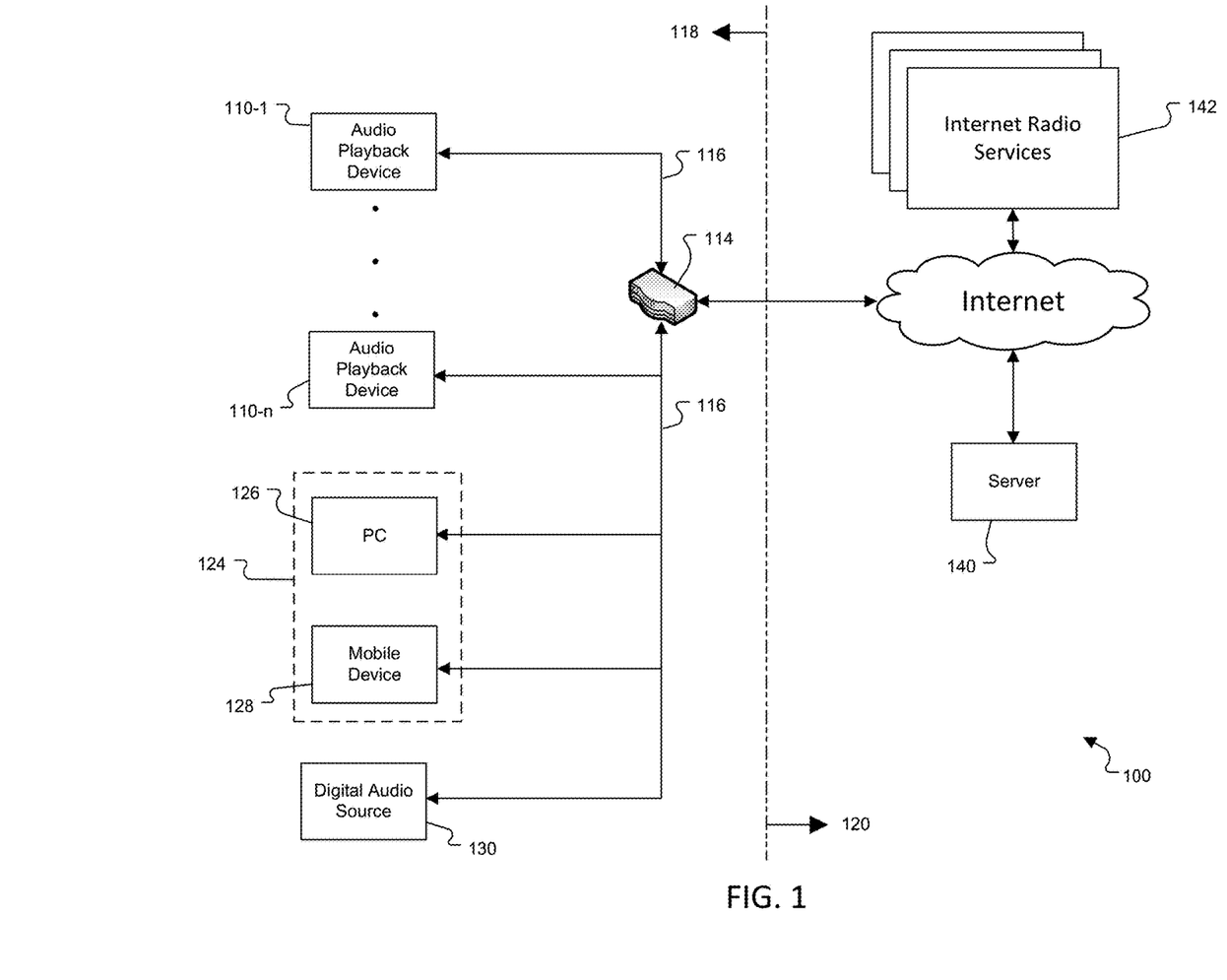
FIG. 1 is a schematic block diagram of an audio distribution system.

This disclosure is also based, in part, on the discovery that a more consistent behavior (i.e., more accurate and reliable time synchronization) can be achieved by taking the various physical transmission rates ("phy rates") between the audio playback devices 110 and the AP 114 into consideration in a time synchronization algorithm.

Audio distribution system 100, FIG. 1, can be used to accomplish a method for distributing audio data to, and synchronizing audio data among, a plurality of audio playback devices (e.g., wireless speakers) that are connected to a network. The system 100 is adapted to deliver digital audio (e.g., digital music) and includes a number of audio playback devices 110-1-110-n (collectively referenced as 110). In one non-limiting embodiment, the audio playback devices 110 are identical devices that each include a digital to analog converter that can receive digital audio signals and convert them to analog form. The audio playback devices 110 also include an electro-acoustic transducer that receives the analog audio signals and transduces them into sound. The audio playback devices also include a processor. The audio playback devices are connected to one another and also connected to local router/access point 114 via a network 116. The audio playback devices are thus able to communicate with one another. The network 116 can be a wired and/or wireless network, and can use known network connectivity methodologies. The network 116 is part of a local area network (LAN) 118 which is connected to a wide area network (WAN) 120, in this non-limiting example by connection to Internet 122. The LAN 118 also includes one or more separate computing devices 124 and one or more separate local digital audio sources 130. In this non-limiting example, the computing devices include a personal computer 126 and a mobile computing device 128 such as a smart phone, tablet or the like. The WAN 120 includes server 140, which may store user account information for the audio distribution system, and Internet radio services 142. The server 140 and the Internet radio services 142 can communicate with the LAN via Internet 122.

One use of the system 100 is to play digital audio data, including but not limited to an audio stream, over one or more of the audio playback devices 110. The sources of digital audio provide access to content such as audio streams that move over network 116 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify®, TuneIn®, and vTuner®, for example. Network attached storage devices such as digital audio source 130, and media server applications such as may be found on a mobile computing device, can also be sources of audio data. In a non-limiting example, the user selects the audio source and the playback devices via a user interface provided by a PC 126 and/or a mobile device 128.

Figure 2:
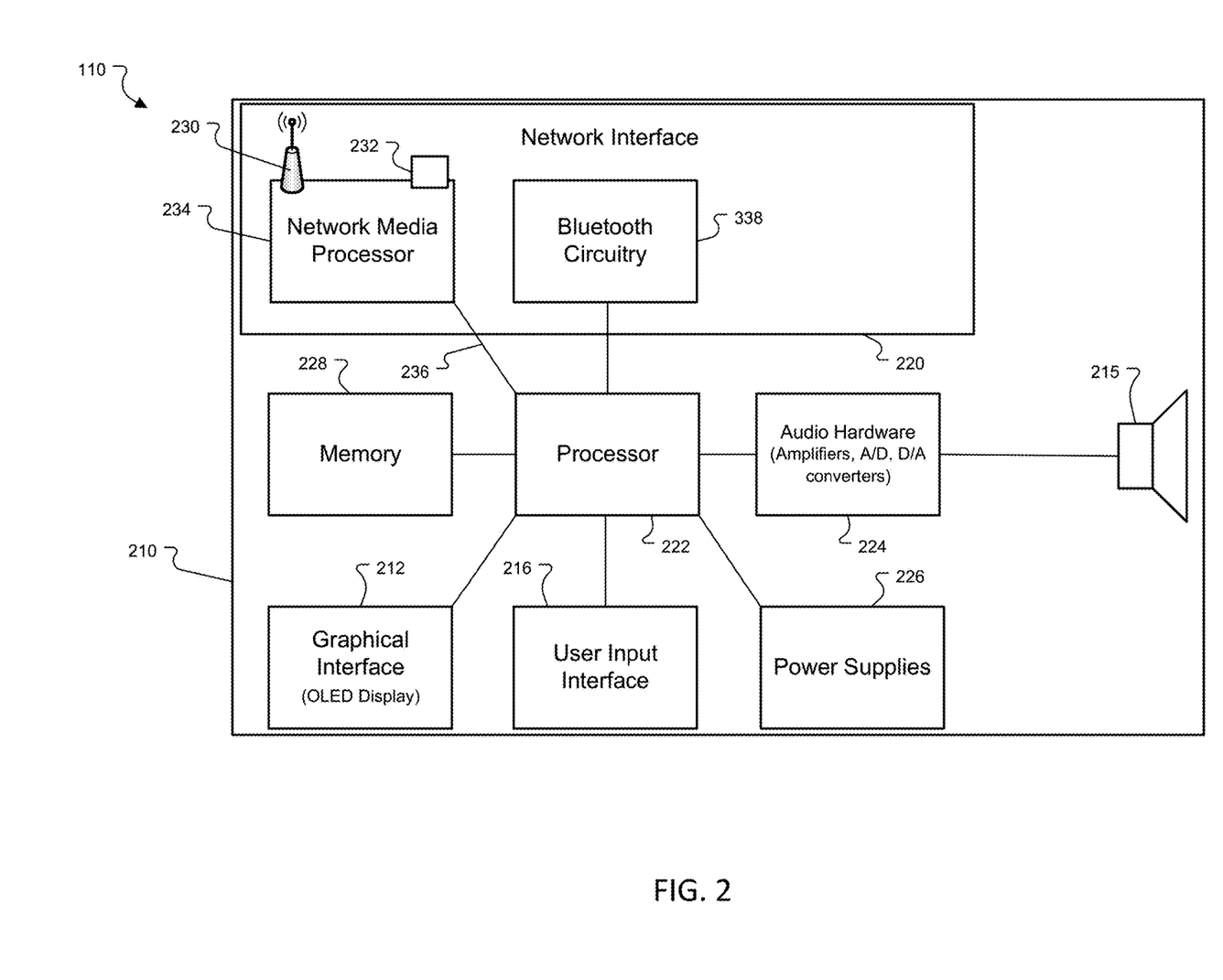
FIG. 2 is a schematic diagram of an audio playback device from the system of FIG. 1.

FIG. 2 illustrates an exemplary audio playback device 110 as an example of this disclosure. The audio playback device 110 includes an enclosure 210 (a/k/a "housing"). On the enclosure 210 there resides a graphical interface 212 (e.g., an OLED display) which can provide the user with information regarding currently playing ("Now Playing") music. There are one or more electro-acoustic transducers 215. The audio playback device 110 also includes a user input interface 216. The user input interface 216 can include a plurality of preset indicators, which can be hardware buttons. The preset indicators can provide the user with easy, one press access to entities assigned to those buttons.

The audio playback device 110 also includes a network interface 220, a processor 222, audio hardware 224, power supplies 226 for powering the various components, and memory 228. Each of the processor 222, the graphical interface 212, the network interface 220, the audio hardware 224, the power supplies 226, and the memory 228 are interconnected using various buses, and several of the components may be mounted on a common motherboard or in other manners as appropriate.

The network interface 220 provides for communication between the wireless speaker package 200 and audio sources and other networked wireless speaker packages and other audio playback devices via one or more communications protocols. The network interface 220 may provide either or both of a wireless interface 230 and a wired interface 232. The wireless interface 230 allows the wireless speaker package 200 to communicate wirelessly with other devices in accordance with a communication protocol such as IEEE 802.11b/g/n/ac. The wired interface 232 provides network interface functions via a wired (e.g., Ethernet) connection.

In some cases, the network interface 220 may also include a network media processor 234 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

All other digital audio coming from network packets comes straight from the network media processor 234 through a USB bridge 236 to the processor 222 and runs into the decoders, DSP, and eventually is played back (rendered) via the electro-acoustic transducer(s) 215. The network interface 220 can also include a Bluetooth circuitry 238 for Bluetooth applications (e.g., for wireless communication with a Bluetooth enabled audio source such as a smartphone or tablet).

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 may be implemented as a chipset of chips that include separate and multiple analog and digital processors. The processor 222 may provide, for example, for coordination of other components of the audio playback device 110, such as control of user interfaces, applications run by the audio playback device 110.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for playback. In addition, the audio hardware 224 may include circuitry for processing analog input signals to provide digital audio signals for sharing with other devices.

The memory 228 may include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer- or machine-readable mediums (for example, the memory 228, or memory on the processor). The instructions may include instructions for performing decoding (i.e., the software modules include the audio codecs for decoding the digital audio streams), as well as digital signal processing and equalization.

Figure 3:
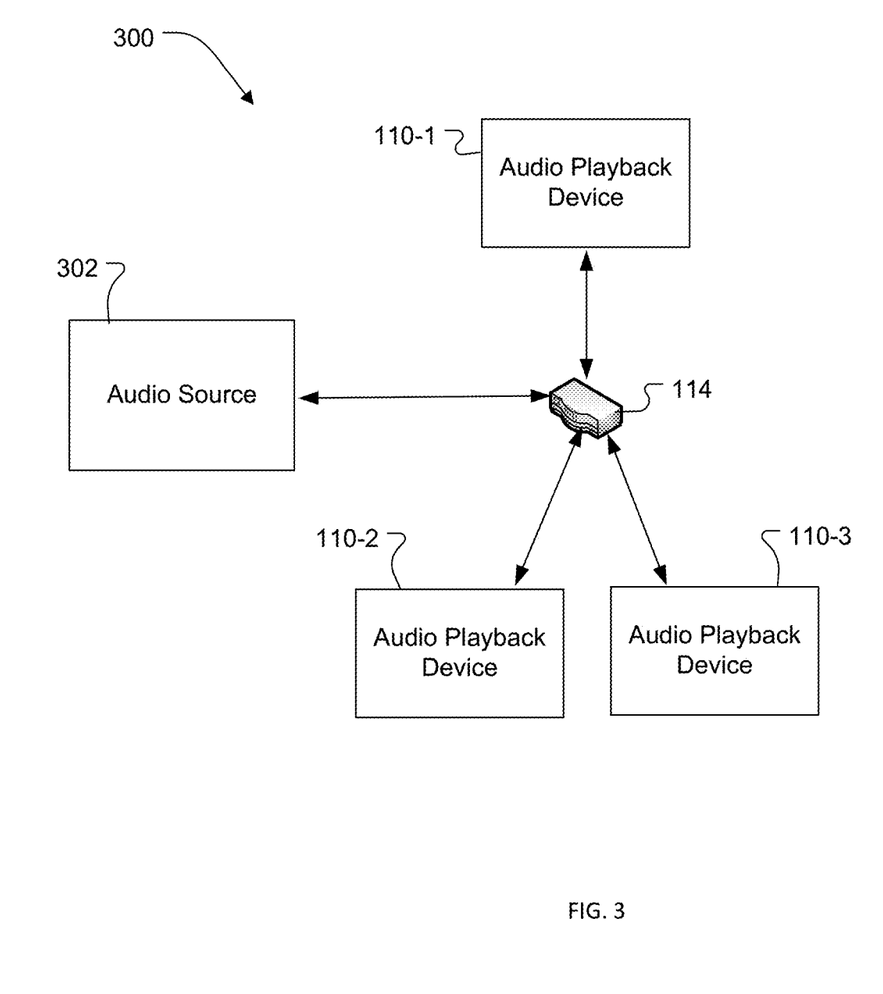
FIG. 3 is functional block diagram of a grouping of audio playback devices from the system of FIG. 1 arranged for synchronized playback of audio.

FIG. 3 is a schematic illustration of a playback group 300 formed from a plurality of the audio playback devices 110-1, 110-2, 110-3 in the audio distribution system of FIG. 1. In the illustrated arrangement, one of the audio playback devices (audio playback device 110-1 in this case) functions as a master audio playback device (a/k/a master device) and the other audio playback devices in the group 300 (i.e., audio playback devices 110-2 & 110-3) function as slave audio playback devices (a/k/a slave devices).

The master device 110-1 receives audio data from an audio source 302 (i.e., one of 130 or 142 of FIG. 1) and distributes it to the slave devices 110-2 and 110-3. In this non-limiting example such audio distribution can be by WiFi via wireless access point/router 114, but distribution could be by any other wireless or wired network protocol, such as a wireless LAN. Each of the audio playback devices 110-1, 110-2, & 110-3 will play the audio. The audio replay among the audio playback devices can be (but need not be) synchronized such that they all play the same audio at the same time.

The slave devices 110-2, 110-3 may be synched to the master device 110-1 using a clock synchronization algorithm that keeps the current clock time on all of the slave devices synchronized with that of the master device 110-1. The audio playback devices 110 all have clocks that are synched to a common reference clock. The clock synchronization algorithm is separate and aside from the audio stream. The clock synchronization algorithm clock data can be provided by the master device 110-1 to the slave devices 110-2, 110-3 every 1 to 6 seconds to keep the slave devices 110-2, 110-3 updated and in sync with the master device 110-1.

Separately, the master device 110-1 provides a "play at" time to the slave devices 110-2, 110-3. This "play at" time represents the time that the devices are to start playing a first sample in an audio track or stream. The "play at" time is communicated in control data that is separate from the audio stream and is only sent once for each track (i.e., it is not included with every frame). Every new track or stream will get a new "play at" time.

The slave devices 110-2, 110-3 receive the first sample in a track or stream and begin playback at the designated "play at" time. Since all devices have the same current clock time, due to the clock synchronization algorithm, they all begin playback at the same time. From there, the devices all provide playback at a constant sample rate, and, consequently, stay in sync.

The oscillators on the individual audio playback devices 110 may vibrate at different frequencies, which could lead to time drift among the devices. Synchronization adjustments to the clock time may cause the duration of audio that the corresponding slave device needs to play to stay in sync to either grow or shrink. An asynchronous sample rate converter (ASRC) on board each audio playback device 110 accounts for these time adjustments and manipulates the received audio data to ensure a constant sample output rate.

Figure 4:
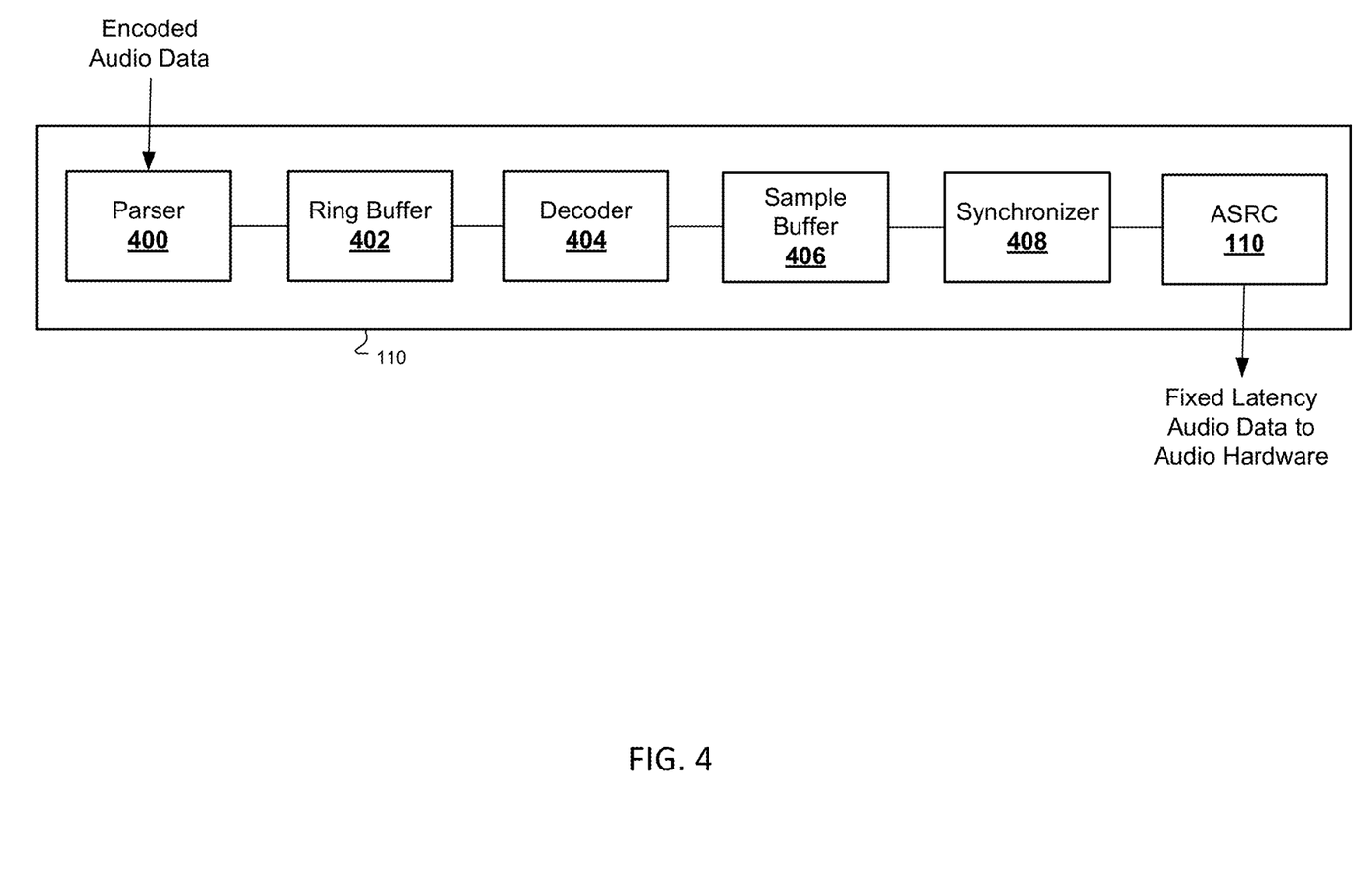
FIG. 4 is a schematic block diagram of functional aspects of an audio playback device from the system of FIG. 1.

With reference to FIG. 4, each audio playback device 110 includes a parser 400; a ring buffer 402; a decoder 404; a sample buffer 406; a synchronization module 408; and an asynchronous sample rate converter (ASRC) 410. These components may be in addition to the components illustrated in FIG. 2 or may be included in, for example, the processor 222, audio hardware 224, and/or memory 228 illustrated in FIG. 2. At the beginning of a stream, the data (e.g., encoded audio) starts to flow to the master audio playback device (a/k/a "master device") where it is parsed by the master device's parser 400 to identify frame boundaries. The parser 400 strips away any container (e.g., MP3) that encoded audio is packed in and puts it into custom audio frames. The parsed but still encoded data is stored in the master device's ring buffer 402. Next, the encoded data is decoded and a time offset is generated and affixed to the header of the audio frame and the decoded audio frames are stored in the sample buffer 406. The offset represents a time difference between the time when playback of the corresponding frame should start and the "play at" time. The offset is used by the synchronization module 408 to determine when the audio samples from the corresponding audio frame are fed into the ASRC 410. The ASRC 410 ensures a constant sample-rate for rendering.

For synchronized playback, the encoded data is immediately pulled out of the master device's ring buffer 402 and is provided to the slave audio playback devices' (a/k/a slave devices') ring buffer 402. This distribution of encoded audio data may take place via unicast communications between the master device and each of the individual slave devices. From there, the slave devices follow the same process as outlined above with respect to the masters. Each slave device will decode the encoded audio pulled from the master device, assign an offset to the frame header, and store the decoded audio frames in their respective sample buffers 406. The slave devices each apply their own offsets to the audio frames, but these offsets will be the same as those applied by the master device since each device is receiving the same stream and is using the same decoder software.

Since the clocks on the master device and the slave devices are in sync and the offsets are all the same, each device in the group (e.g., group 300, FIG. 3) will feed the same data into its ASRC 410 at the same time. The ASRCs 410 ensure that each device outputs the audio at the same, constant rate. The oscillators on the individual devices may vibrate at different frequencies, which could lead to time drift among the devices despite the timing synchronization. Synchronization adjustments to the clock time may cause the duration of audio that the corresponding slave device needs to play to stay in sync to either grow or shrink. The ASRCs 410 on each device account for these time adjustments and manipulate the received audio data to ensure a constant sample output rate.

Figure 5:
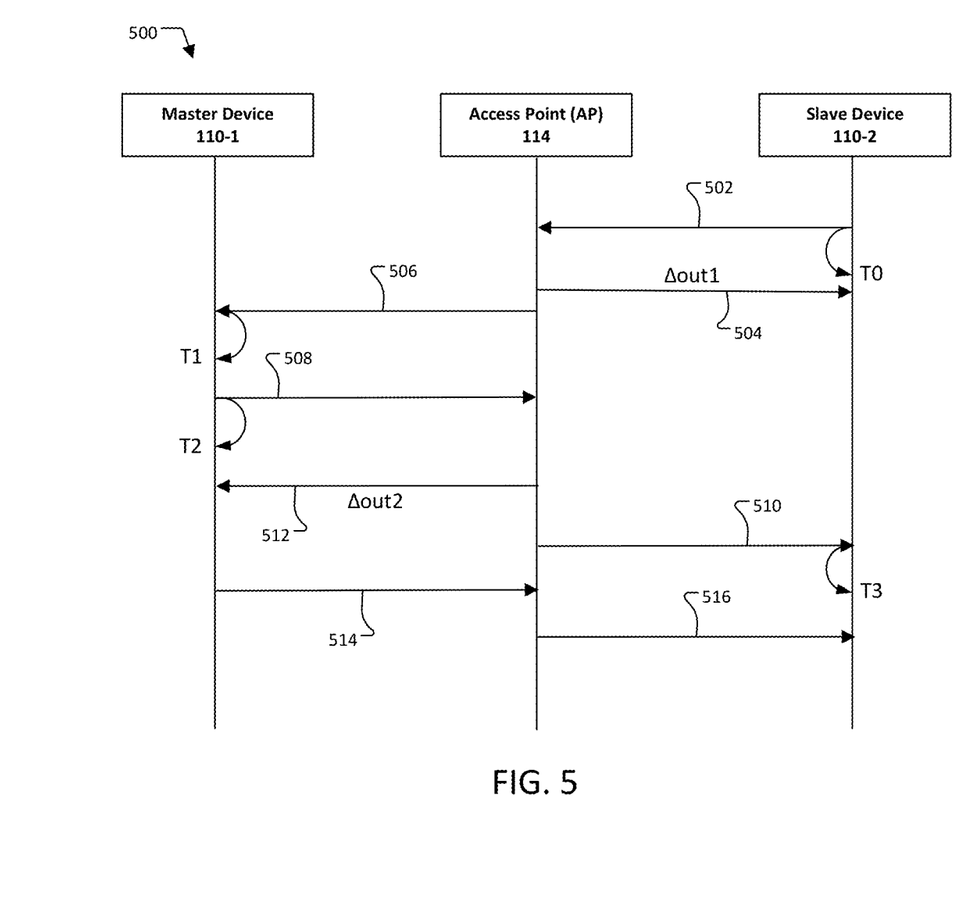
FIG. 5 is a representative communication path between a slave audio playback device and a master audio playback device.

FIG. 5 illustrates a representative communication path 500 between a slave audio playback device ("slave device 110-2") and a master audio playback device ("master device 110-1"). In this diagram it is assumed that the time-stamps collected at the physical/MAC layer are taken at the start of transmission, not the completion.

There are a series of communications that take place between the master device 110-1 and the slave device 110-2, via the AP 114, which allow the slave device 110-2 to update its local clock time to match that of the master device 110-1. Initially, the slave device 110-2 transmits a time request 502 (i.e., a communication intended for the master device 110-1 requesting a current time on the master device 110-1). The slave device 110-2 records the time that this initial request is sent with a timestamp, T0.

The time request 502 will be received by the AP 114 and will be relayed to the master device 110-1. Upon receipt of the time request, the AP 114 will also send a confirmation of receipt 504 back to the slave device 110-2. The confirmation allows the sender to determine the phy rate and therefore know the duration of the transmission, $\Delta$out1, for the transmission of the initial request from the slave device 110-2 to the AP 114, which the slave device 110-2 will record.

The AP 114 will then transmit the request to the master device 110-1 in a request relay 506. Upon receipt of the request at the master device 110-1, the master device 110-1 will record the time of receipt, T1, (i.e., a local time on the master device 110-1 when the message was received). The master device 110-1 will then transmit a response 508 to the slave device 110-2. The response 508 will include the receipt time, T1, of the transmission of the request relay 506 from the AP 114 to the master device 110-1. After the transmission is sent, the master device 110-1 will record the send time, T2, (i.e., a local time on the master device 110-1 when the message was sent). As discussed below, T2 will be shared with the slave device 110-2 in a subsequent communication.

The response 508 will be received at the AP 114, and the AP 114 will transmit the response to the slave device 110-2 in a response relay 510. Upon receipt of the response, the AP 114 will also send a confirmation of receipt 512 back to the master device 110-1. The confirmation will include an indication of the phy rate and therefore the time of transmission, $\Delta$out2, for the transmission of the response from the master device 110-1 to the AP 114, which the master device 110-1 will record. $\Delta$out2, will be shared, along with T2, in a subsequent communication with the slave device 110-2.

Upon receipt of the response from the AP 114, the slave device 110-2 will record the time of receipt, T3, (i.e., a local time on the slave device 110-2 when the response message was received), and the information included in the response message (i.e., T1) for use in calculating a time update.

Before the time update can be calculated, the slave device 110-2 will also need to know the send time T2 and phy rate, $\Delta$out2, for the transmission of the response from the master device 110-1 to the AP 114. That information will be communicated in a subsequent message 514 from the master device 110-1, which will be relayed 516 to the slave device 110-2 via the AP 114. This subsequent message 514/516 may be an unsolicited communication from the master device 110-1 to the slave device 110-2, or may be provided as a downstream response to a subsequent time request from the slave device 110-2. After receiving this subsequent message, the slave device 110-2 has all of the information that it needs (i.e., T0, T1, T2, T3, $\Delta$out1, $\Delta$out2) to calculate a time update.

Before the time update is calculated, a first transmission time (Tgo) is calculated. Tgo corresponds to the time that it took to transmit the initial request from the slave device 110-2 to the master device 110-1, less the delay attributable to the phy rate $\Delta$out1. Tgo is calculated as shown in Equation 1.

$$Tgo=T1-(T0\Delta out1) \quad (Eq.\ 1)$$

A second transmission time (Tback) is also calculated. Tback corresponds to the time it took to transmit the response from the master device 110-1 to the slave device 110-2, less the delay attributable to the phy rate $\Delta$out2. Tback is calculated according to Equation 2.

$$Tback=T3-(T2+\Delta out2) \quad (Eq.\ 2)$$

Notably, these adjusted transmission times Tgo, Tback take into consideration the phy rates ($\Delta$out1 and $\Delta$out2), which allows the time update algorithm to operate consistently even when there is variation in the phy rates. This can provide a better model of the time spent in the access point 114 or back-end network.

Once the transmission times Tgo and Tback are calculated, a round trip time, RTT, is calculated according to Equation 3.

$$RTT=Tgo+Tback \quad (Eq.\ 3)$$

The RTT is then used to calculate the time update, Tnow, which represents the current time on the master device (or the time that a clock on the slave device 110-2 needs to be updated to in order to match/synchronize to that of the master). Tnow can be calculated according to Equation 4.

$$Tnow=T2RTT/2 \quad (Eq.\ 4)$$

The incorporation of the physical transmissions rates into the time update algorithm can help to avoid inconsistent operation when the physical transmission rates between network devices vary.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. An audio distribution system comprising:
    a first audio playback device including one or more electro-acoustic transducers configured to transduce received audio signals into sound, the first audio playback device having a first clock time;
    a second audio playback device including one or more electro-acoustic transducers configured to transduce received audio signals into sound, the second audio playback device having a second clock time; and
    a wireless access point wirelessly coupled to the first and second audio playback devices, wherein the second audio playback device is configured to send a time request to the first audio playback device via the wireless access point, wherein the first audio playback device is configured to respond to the time request by sending a time response to the second audio playback device via the wireless access point, wherein the second audio playback device is configured to calculate an update to the second clock time based on the time response from the first audio playback device, a first physical transmission rate between the second audio playback device and the wireless access point that is determined using a transmission confirmation from the wireless access point to the second audio playback device, and a second physical transmission rate between the first audio playback device and the wireless access point that is determined using a transmission confirmation from the wireless access point to the first audio playback device, thereby to synchronize the second clock time to the first clock time, and wherein the second audio playback device is configured to use the update to the second clock time to playback audio in synchrony with the first audio playback device.

2. The audio distribution system of claim 1, wherein the second audio playback device is configured to calculate a first time duration (Tgo) corresponding to the time it took to transmit the time request from the audio playback device to the other audio playback device less a first delay attributable to the first physical transmission rate.

3. The audio distribution system of claim 2, wherein the second audio playback device is configured to record a value of the second clock time when the time request is sent with a first time stamp (T0), and wherein the second audio playback device is configured to calculate the first time duration using the first time stamp.

4. The audio distribution system of claim 3, wherein first audio playback device is configured to record a value of the first clock time when the time request is received at the first audio playback device with a second time stamp (T1), and wherein the second audio playback device is configured to calculate the first time duration using the second time stamp.

5. The audio distribution system of claim 4, wherein the first audio playback device is configured to record a value of the first clock time when the time response is sent from the first audio playback device with a third time stamp (T2), and wherein the second audio playback device is configured to calculate a second time duration (Tback) using the third time stamp.

6. The audio distribution system of claim 5, wherein the second audio playback device is configured to record a value of the second clock time when the time response is received with a fourth time stamp (T3), and wherein the second audio playback device is configured to calculate the second time duration using the fourth time stamp.

7. The audio distribution system of claim 6, wherein the second audio play back device is configured to calculate a round trip time based on the first time duration and the second time duration.

8. The audio distribution system of claim 7, wherein the second audio playback device is configured to calculate the update to the second clock time using the round trip time and the third time stamp.

9. An audio playback device comprising:
a digital-to-analog converter configured to receive an audio stream comprising a digital representation of audio content via a network and convert to analog form;
an electro-acoustic transducer;
a network interface;
a processor coupled to the digital-to-analog converter, the electro-acoustic transducer, and the network interface; and
instructions stored on a non-transitory computer-readable media that, when executed, cause the processor to:
send a time request to an other audio playback device via a wireless access point wirelessly coupled to the network interface,
receive, in response to the time request, a time response from the other audio playback device via the wireless access point,
calculate an update to a local clock time based on the time response, a first physical transmission rate between the audio playback device and the wireless access point that is determined using a transmission confirmation from the wireless access point to the audio playback device, and a second physical transmission rate between the other audio playback device and the wireless access point that is determined using a transmission confirmation from the wireless access point to the other audio playback device, thereby to synchronize a local clock time to an other clock time maintained by the other audio playback device, and
update the local clock time, based on the calculation, to playback audio in synchrony with the other audio playback device.

10. The audio playback device of claim 9, wherein the instructions further cause the processor to calculate a first time duration (Tgo) corresponding to the time it took to transmit the time request from the audio playback device to the other audio playback device less a first delay attributable to the first physical transmission rate.

11. The audio playback device of claim 10, wherein the instructions further cause the processor to calculate a second time duration (Tback) corresponding to the time it took to transmit the time response from the other audio playback device to the audio playback device less a second delay attributable to the second physical transmission rate.

12. The audio playback device of claim 11, wherein the instructions further cause the processor to calculate a round trip time based on the first time duration and the second time duration.

13. The audio playback device of claim 12, wherein the instructions further cause the processor to calculate the update to the local clock time based on a value of the other clock time when the time response is sent from the other audio playback device and the round trip time.

14. The audio playback device of claim 9, wherein the instructions further cause the processor to record a value of the local clock time when the time request is sent with a first time stamp (T0), wherein the audio playback device is configured to calculate the update to the local clock time based on the first time stamp.

15. The audio playback device of claim 14, wherein the instructions further cause the processor to calculate the update to the local clock time based on a second time stamp (T1) that corresponds to a value of the other clock time when the time request is received at the other audio playback device.

16. The audio playback device of claim 15, wherein the instructions further cause the processor to calculate the update to the local clock time based on a third time stamp (T2) that corresponds to a value of the other clock time when the time response is sent from the other audio playback device.

17. The audio playback device of claim 16, wherein the instructions further cause the processor to calculate the update to the local clock time based on a fourth time stamp (T3) that corresponds to a value of the local clock time when the time response is received.

18. The audio playback device of claim 9, further comprising a crystal oscillator coupled to the processor and configured to provide a clock signal to the processor, wherein the processor uses the clock signal to maintain the local clock time.

19. A method for synchronizing respective clocks on a plurality of audio playback devices that each include one or more electro-acoustic transducers configured to transduce received audio signals into sound, the plurality of audio playback devices comprising a first audio playback device having a first clock time, and a second audio playback device having a second clock time, the method comprising:

sending a time request from the second audio playback device to the first audio playback device via a wireless access point, sending, in response to the time request, a time response from the first audio playback device to the second audio playback device via the wireless access point, calculating an update to the second clock time based on the time response from the first audio playback device, a first physical transmission rate between the second audio playback device and the wireless access point that is determined using a transmission confirmation from the wireless access point to the second audio playback device, and a second physical transmission rate between the first audio playback device and the wireless access point that is determined using a transmission confirmation from the wireless access point to the first audio playback device, thereby to synchronize the second clock time to the first clock time, and using the update to the second clock time to playback audio in synchrony with the first audio playback device.

20. The method of claim 19, wherein the update is calculated at the second audio playback device.

\* \* \* \* \*